No. 755,604. PATENTED MAR. 29, 1904.
R. M. BABIN.
PARING IMPLEMENT.
APPLICATION FILED MAY 14, 1903.
NO MODEL.

WITNESSES.
H. A. Lamb.
S. W. Atherton.

INVENTOR.
Robert M. Babin
By A. M. Wooster
Atty.

UNITED STATES PATENT OFFICE.

ROBERT M. BABIN, OF WATERBURY, CONNECTICUT.

PARING IMPLEMENT.

SPECIFICATION forming part of Letters Patent No. 755,604, dated March 29, 1904.

Application filed May 14, 1903. Serial No. 157,064. (No model.)

*To all whom it may concern:*

Be it known that I, ROBERT M. BABIN, a citizen of the United States, residing at Waterbury, county of New Haven, State of Connecticut, have invented a new and useful Paring Implement, of which the following is a specification.

My invention relates to the class of kitchen implements which remove the skin of potatoes, turnips, apples, pears, peaches, and the various vegetables and fruits by a drawing movement over the surface of the vegetable or fruit to be pared, and has for its object to provide an implement of this character with a cutting edge that may be instantly and conveniently adjusted to remove more or less of the surface of vegetables or fruit and to provide for wearing away of the edge after long-continued use and sharpening.

With these and other objects in view the invention consists in certain constructions and in certain parts, improvements, and combinations, which will be hereinafter described and then specifically pointed out in the claims hereunto appended.

Figure 1:
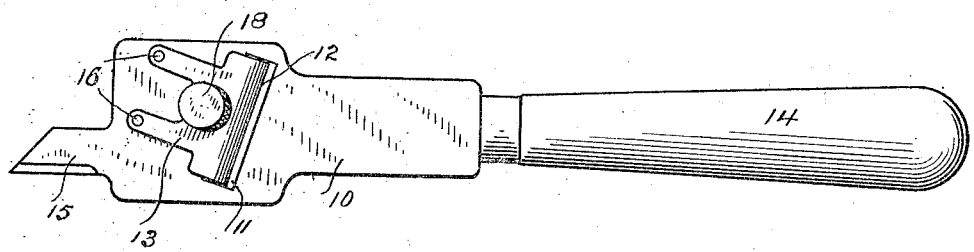
Figure 2:
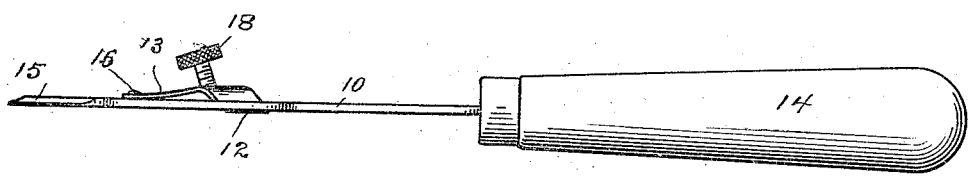
Figure 3:
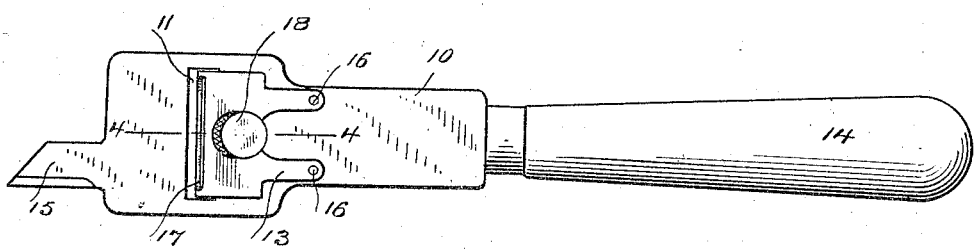
Figure 4:
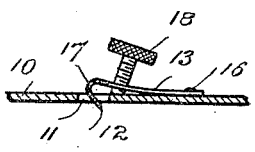

In the accompanying drawings, forming part of this specification, Figures 1 and 3 are plan views illustrating slightly-variant forms in which I have carried the principle of the invention into effect. Fig. 2 is an edge view corresponding with Fig. 1, and Fig. 4 is a detail longitudinal section on the line 4 4 in Fig. 3.

My novel paring implement consists, essentially, of a plate which I have indicated by 10 and which is provided with a slot 11 and a cutting edge 12, which is formed upon a plate 13 and is turned at an angle to the plate, so as to project through the slot. The plate 10 is for convenience in use secured to a suitable handle 14. At the forward end of the plate is a blade 15, which may be used as a coring-knife or to remove specks or decayed places from fruits or vegetables. The slot may be oblique, as in Figs. 1 and 2, or transverse, as in Figs. 3 and 4, the special details of construction being wholly unimportant so far as the principle of the invention is concerned. The plate 13, which carries the cutting edge, may be attached to plate 10 by means of rivets 16 and may be attached forward of the slot, as in Figs. 1 and 2, or in the rear of the slot, as in Figs. 3 and 4. When attached in front of the slot, the cutting edge is bent sufficiently to pass through the slot and to operate to the best advantage in general work in paring fruits and vegetables, the cutting edge lying at an obtuse angle to the plates, as will be obvious from Fig. 2. When plate 13 is attached to plate 10 in the rear of the slot, as in Figs. 3 and 4, the cutting edge is necessarily bent backward, so as to lie at an acute angle to plate 13, as is clearly shown in Fig. 4. In this form, the movement in use being a drawing movement, as in the other form, a slot 17 is provided in the curve at the intersection of the cutting edge with plate 13 for the paring to pass through.

In order to hold the cutting edge firmly in operative position and also to provide a simple and convenient adjustment should it be required to cut more or less deeply in paring different kinds of fruit and vegetables, I provide a set-screw 18, which passes through a threaded hole in plate 13 and the end of which bears against plate 10, so that slight movement of the set-screw in the direction required will move the cutting edge in or out relatively to plate 10, and thereby regulate the depth of the cut. In the drawings I have shown the set-screw as passing through plate 13 obliquely, although this is of course unimportant so far as the principle of the invention is concerned.

Having thus described my invention, I claim—

1. A paring implement comprising a plate 10 having a slot, a plate 13 secured to plate 10 and carrying a cutting edge which projects through the slot and a set-screw threaded to engage plate 13 and bearing against plate 10, whereby the cutting edge may be adjusted, substantially as shown, for the purpose specified.

2. A paring implement comprising a plate 10 having a slot 11, a plate 13 secured to plate 10 in the rear of the slot and carrying a cutting edge projecting through the slot at an acute angle to the plates and having a slot 17 at the intersection of the cutting edge with plate 13 through which a paring may pass and a set-screw engaging plate 13 and bearing against plate 10.

In testimony whereof I affix my signature in presence of two witnesses.

ROBERT M. BABIN.

Witnesses:
 WM. BABIN,
 J. H. LIPPKE.